US006764111B2

(12) United States Patent
Graves

(10) Patent No.: US 6,764,111 B2
(45) Date of Patent: Jul. 20, 2004

(54) COMPRESSION CLAMP FOR WATER-TIGHT SEALING OF TUBULAR COMPONENTS

(75) Inventor: Jan D. Graves, Norwalk, OH (US)

(73) Assignee: Norwalk Wastewater Equipment Company, Norwalk, OH (US)

(*) Notice: Subject to any disclaimer, the term of this patent is extended or adjusted under 35 U.S.C. 154(b) by 221 days.

(21) Appl. No.: 10/165,960

(22) Filed: Jun. 11, 2002

(65) Prior Publication Data

US 2002/0148781 A1 Oct. 17, 2002

Related U.S. Application Data

(62) Division of application No. 09/541,882, filed on Mar. 31, 2000, now Pat. No. 6,416,667.

(51) Int. Cl.$^7$ ................................................. F16L 25/00
(52) U.S. Cl. ........................ 285/423; 285/903; 24/16 PB
(58) Field of Search ....................... 24/16 PB; 285/423, 285/903

(56) References Cited

U.S. PATENT DOCUMENTS

| 4,202,568 A | * | 5/1980 | Strom ........................ 285/336 |
| 4,763,932 A | * | 8/1988 | Matz et al. ............ 285/148.17 |
| 5,207,896 A | | 5/1993 | Graves |
| 5,264,120 A | | 11/1993 | Graves |
| 5,488,760 A | * | 2/1996 | Jansen ...................... 24/16 PB |
| 5,815,892 A | * | 10/1998 | Geppert ...................... 24/20 R |

FOREIGN PATENT DOCUMENTS

JP 10009464 A * 1/1998 ........... F16L/33/00

OTHER PUBLICATIONS

Orenco Systems, Inc. (3 pages).
Jackel Triple Garage Ste Basins (Gas & Oil Interceptors), 1998 (3 pages).
The Zabel Zone—Spring '98 (6 pages).

* cited by examiner

Primary Examiner—Chester T. Barry
(74) Attorney, Agent, or Firm—Diller, Ramik & Wight

(57) ABSTRACT

A method of and an apparatus for rejuvenating a wastewater treatment system of the type including a septic tank, an aerobic treatment unit or the like connected by a pipe to a plugged downstream soil absorption system includes a wastewater treatment unit which is interposed between the septic unit/aerobic treatment unit and the downstream soil absorption system. The wastewater treatment unit includes a single piece or a multiple piece solids settling and retention basin within which is suspendingly supported a wastewater treatment mechanism essentially of the type disclosed in U.S. Pat. No. 5,264,120. The wastewater treatment mechanism includes filters for filtering and settling solids from wastewater and flow equalization ports for effecting flow equalization thereby eliminating flow surges to the downstream plugged soil absorption system. By utilizing an extremely compact solids settling and retention basin and its attendant operative components, solids are prevented from passing beyond the wastewater treatment unit to the failed soil absorption system. In this fashion the wastewater treatment unit of the present invention can rejuvenate wastewater treatment systems which have failed, and if installed prior to such failure, can extend the life thereof substantially indefinitely. The latter and other advantages are achieved at relatively low cost, absent destruction of existing sod or lawn, moving fencing, trees, etc., and absent creating a hazard for individuals, particularly small children.

13 Claims, 6 Drawing Sheets

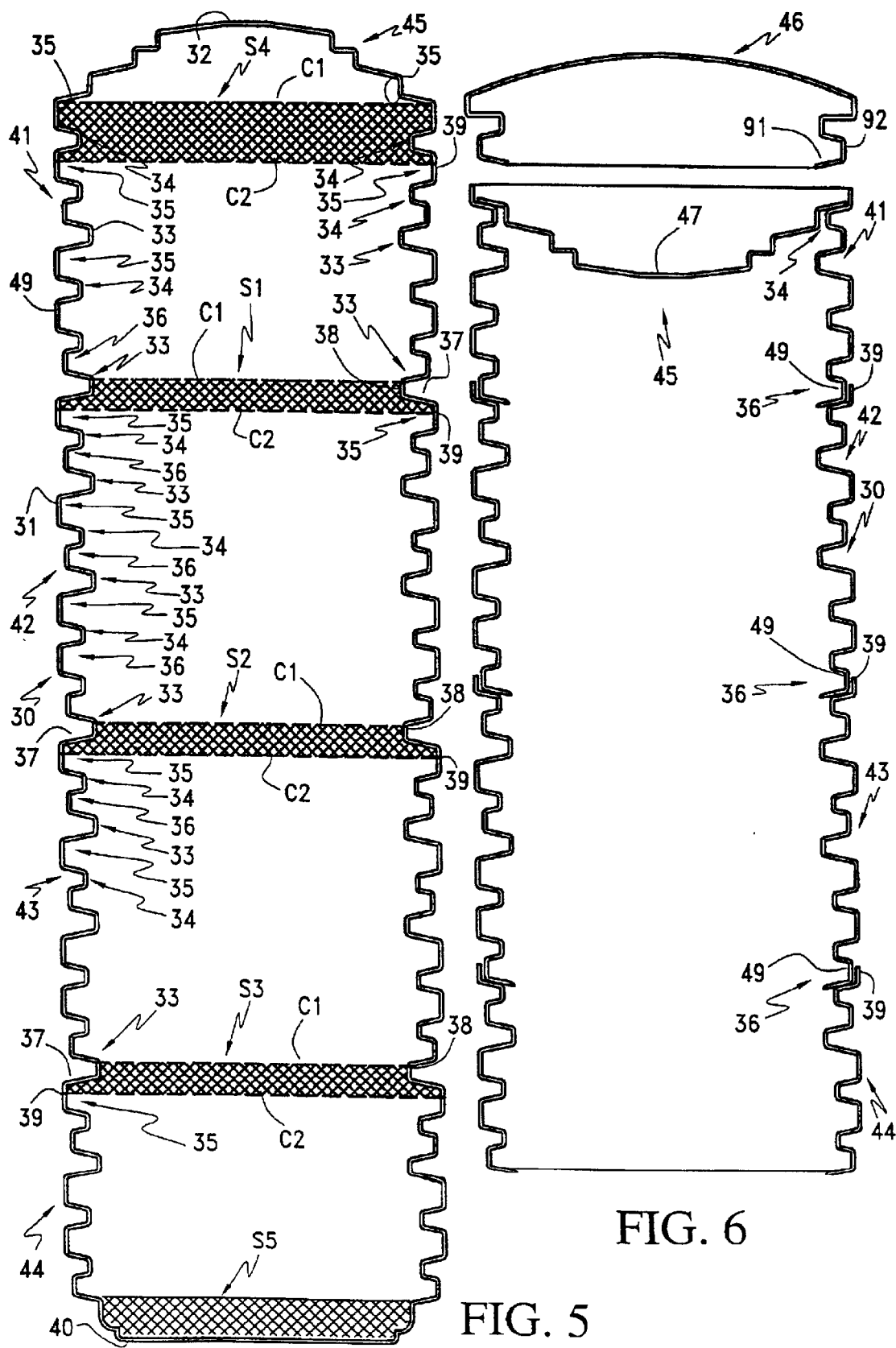

COMPRESSION CLAMP FOR WATER-TIGHT SEALING OF TUBULAR COMPONENTS

CROSS-REFERENCE TO RELATED APPLICATION

This application is a divisional application of Ser. No. 09/541,882 filed on Mar. 31, 2000, and now U.S. Pat. No. 6,416,667.

BACKGROUND OF THE INVENTION

The most widely used on-site wastewater treatment systems for individual households have traditionally been either septic systems or aerobic treatment units. Septic systems generally include a septic tank followed by a leaching tile field or a similar absorption device located downstream, but physically on-site of the individual residence. The septic tank allows for larger/heavier solids in the sewage to settle out within the tank, while anaerobic bacteria partially degrade the organic material in the waste. The discharge from the septic tank is further treated by dispersion into the soil through any number of soil absorption devices, such as a leaching tile field, whereby bacteria in the soil continue the biodegradation process.

The conventional septic system is typically a flow-through system. The septic tank and the tile field are positioned so that sewage is carried out of the residence and through the treatment system by gravity and hydraulic displacement. As a flow-through system, the tank relies on sufficient hydraulic capacity to slow the velocity of the flow and allows settling of the solids to take place. Unfortunately, as the settable solids accumulate in the bottom of the tank, they displace the beneficial tank volume, effectively increasing the velocity of flow through the tank and decreasing the efficiency of solids removal. Also, as a flow-through system, the velocity of the flow through the tank and the related efficiency of solids removal by gravity are dependent upon the volume and frequency of the incoming sewage. A lower volume and rate of incoming sewage flow allows for greater gravity separation and removal efficiency. Higher volumes and rates of flow therefore decrease gravity settling and solids removal efficiency. Over the course of time, an increasing in volume of organic material is discharged from the tank (due to decreasing removal efficiency) until the total volume of solids discharged over the life of the system exceeds the capacity of the downstream soil absorption system (leaching tile field) to accomplish further treatment. The soil absorption system will then retain solids and become plugged, thereby causing a back-up of sewage into the home. In this situation, the downstream soil absorption system is considered failed. Rejuvenation of a failed soil absorption system is not technologically feasible. Therefore, the downstream soil absorption system or other downstream device must be replaced or a new downstream device installed. However, even if sufficient land area is available toward the installation of a new downstream device, such can be accomplished only at considerable cost and inconvenience. Typically, heavy construction equipment is required to excavate and install any new replacement leaching tile field (a commonly used soil absorption system), or a similar device. This is much more inconvenient and costly then at the time of installation of the original treatment system. Construction equipment operating around an occupied residence frequently requires considerable destruction of hundreds of square feet of existing sod or lawn, moving fences, trees or recreational equipment, and creating a hazard for individuals, particularly smaller children.

Most aerobic treatment units are also flow through systems. Unlike septic tanks, aerobic treatment units perform primary (anaerobic) treatment and secondary (aerobic) treatment within the confines of the system. This arrangement provides a much higher degree of treatment within a relatively small area. As traditional aerobic treatment units are designed for a much higher removal of solids and organic compounds than anaerobic treatment units, a downstream device is frequently not required or is severely diminished in size compared to one which would be required downstream of a septic tank. In a traditional aerobic treatment unit, the first stage of the process is called pretreatment and provides for anaerobic treatment very much like that provided by a septic tank. A separate, isolated pretreatment chamber contains sufficient hydraulic capacity to slow the velocity of the flow somewhat and allows the settling of some of the solids to take place. Anaerobic bacteria partially degrade the organic material in the waste. As a flow through system, the contents of the pretreatment chamber (partially treated waste) are displaced by incoming sewage, and are transferred to the aeration chamber or biological reactor.

Within the aeration chamber, air is introduced in controlled amounts creating a proper environment for the development of a number of types of aerobic bacteria. The aerobic bacteria maintain a higher metabolic rate than anaerobic bacteria, which causes them to readily consume the organic material contained in the pretreated sewage. Prior to discharge of this flow through system, the aerobic bacteria (commonly called activated sludge) must be separated from the treated liquid. If the activated sludge particles are allowed to exit the system, two problems occur. First, the activated sludge would not be available to treat additional incoming sewage. As the system is operated on a continuing basis, the cultured bacteria need to be retained for future use. Secondly, if the activated sludge is allowed to be discharged from the system, the organic nature of the sludge would be considered a pollutant if returned directly to the environment.

Commonly, the activated sludge is separated from the treated liquid by allowing the solids to settle out in a gravity clarifier. In a flow through system, the contents of the aeration chamber containing the activated sludge are hydraulically displaced to the clarifier by partially treated liquid entering from the pretreatment chamber. Once in the gravity clarifier, quiescent conditions allow the activated sludge to slowly settle to the bottom of the chamber while the treated liquid is discharged from the system near the top of the chamber. The clarifier relies on having sufficient hydraulic capacity to slow the velocity of the flow through the chamber and thereby allows the activated sludge solids to settle to the bottom. The settled sludge at the bottom of the clarifier is returned, by various means, to the aeration chamber. This return prohibits the clarifier from accumulating a large volume of solids and thereby reducing the efficiency of solids separation. However, as a flow through system, the settling efficiency of the clarifier is dependent also on the volume and frequency of the incoming sewage flow.

From the foregoing, it is clearly seen that the efficient and long-term operation of a flow through septic system or a flow through aerobic treatment unit is dependent on eliminating surges and maintaining a uniform, consistent rate of flow through the system. Unfortunately, a uniform, consistent rate of flow through a residential wastewater system is not commonly achieved. Modern homes are furnished with many water using appliances that generate large volumes of sewage flow in compressed periods of time. Wastewater from washing machines, dishwashers, hot tubs, spas, and similar appliances tend to be high in volume and discharge within a short period of time. These concentrated hydraulic surges disrupt the quiescent environment of septic tanks or aerobic treatment units, reducing efficiency of the gravity settling process. This effect causes partially treated waste or biological solids to be discharged to a downstream soil absorption system or other downstream treatment device resulting in premature failure, or causes biological solids to be returned to the environment as a pollutant.

SUMMARY OF THE INVENTION

An object of the present invention is to enhance the operation of new or existing septic tanks or aerobic treatment units to prohibit the discharge of partially treated waste or other organic solids. By installing a novel wastewater treatment unit of the present invention downstream of a new or existing septic tank or an aerobic treatment unit, but upstream of a soil absorption system, device or a discharge point, the discharge of partially treated waste or other organic solids is substantially totally precluded. In particular, the wastewater treatment unit of the present invention is of a relatively compact size and its installation as aforesaid can be accomplished with minimum disturbance to existing yards, landscaping or home sites whose downstream soil absorption system is being newly installed or has been installed for a time and is failing. Even if the downstream treatment system has not failed, the installation of the wastewater treatment unit of the present invention provides enhanced performance benefits to new or previously installed residential wastewater treatment systems at a minimum of cost, effort and installation time. By thus installing the wastewater treatment unit of the present invention into or as part of a residential wastewater treatment system, an increase in the serviceability of the latter is automatically achieved. As the total volume of solids discharged by a secondary treatment system typically accumulate in the downstream soil absorption system or device, premature failure is common. Removal of accumulated solids from a failed or plugged soil absorption device is not technological feasible, but rejuvenation thereof can be achieved by the present invention in the sense that the wastewater treatment unit of the present invention can be installed upstream from the failed soil absorption system and will accumulate solids which can in turn be removed readily from grade thereby preventing solids from passing beyond the wastewater treatment unit to the failed soil absorption system. In this fashion the wastewater treatment unit of the present invention can rejuvenate wastewater treatment systems which have failed and, if installed prior to such failure, can extend the life thereof.

The latter objects are achieved by a novel wastewater treatment unit utilizing substantially the wastewater treatment mechanism disclosed in U.S. Pat. No. 5,264,120 granted on Nov. 23, 1993 which is housed in a settling and retention basin which collects solids from domestic wastewater discharge. The settling and retention basin includes an inlet and an outlet pipe or invert which are respectively connected to the discharge of a flow-through septic system or a flow-through aerobic treatment unit and a soil absorption system (leaching tile field) or any such other downstream treatment device. Wastewater enters the settling and retention basin and before being discharged therefrom passes through and is treated by a wastewater treatment mechanism (similar to that of U.S. Pat. No. 5,264,120 which is known in the trade as assignee's Bio-Kinetic® device) which contains three filtration zones, eight settling zones, 37 baffled chamber plates and 280 lineal feet of kinetic filtration, all of which dramatically reduce loading on downstream soil absorption systems. Moreover, within the Bio-Kinetic® device are settling zones which operate in conjunction with filtration and flow equalization to effectively retain BOD and solids which are removed from the flow stream. The Bio-Kinetic® device includes flow equalization ports arranged to manage daily flow variations and control flow through all upstream and downstream treatment processes, higher sustained flow ports which become operative under longer hydraulic surges and, finally, peak flow ports which operate under high, prolonged flow surges. Thus, under all three potential flow patterns, the solids can be settled by the Bio-Kinetic® device and retained in the settling and retention basin for subsequent removal from grade. Since the settling and retention basin has a normal capacity of 52 gallons below an outlet invert, normal liquid and solids retention capacity is quite high, but for special applications additional ring sections and riser sections can be added to dramatically increase the volume of the retention basin and allow water-tight installation at burial depths of up to 12 feet. However, an upper end of the settling and retention basin is at all times exposed above grade and is closed by a heavy duty access cover which permits the removal and cleaning of the Bio-Kinetic® device, the removal of solids from the settling and retention basin, and the re-installation of the Bio-Kinetic® device into the settling and retention basin for continued use. Thus, by installing the wastewater treatment unit of the present invention upstream of new or existing tile fields, sand filters, leaching fields, mounds, irrigation systems, constructed wet lands or any process that is biologically sensitive, hydraulically sensitive or difficult to replace, effective wastewater treatment is assured through the settling and storage of suspended solids, flow equalization, filtration and, if desired, chemical addition.

Thus, upon the installation of the wastewater treatment unit of the present invention immediately downstream of a new or existing septic tank or an aerobic treatment unit, the following advantages are achieved:

a) direct filtration and settling of treated wastewater or treated effluent, b) beneficial flow equalization through all upstream and downstream treatment stages, c) the addition of downstream chemicals via chemical feeders, d) the enhancement of beneficial nitrification, and e) the enhancement of beneficial de-nitrification.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 5 is an axial cross sectional view through a one-piece molded solids settling and retention basin body immediately after the molding thereof, and illustrates shaded areas representing annular bands of waste material which can be selectively removed to form a segmented solids settling and retention basin and its associated safety/service guard or cover.

FIG. 6 is an axial cross sectional view of the segmented solids settling and retention basin body, and illustrates as exemplary the manner in which riser sections and/or ring sections can be interchangeably mated with each other.

DESCRIPTION OF THE PREFERRED EMBODIMENT

Figure 1:
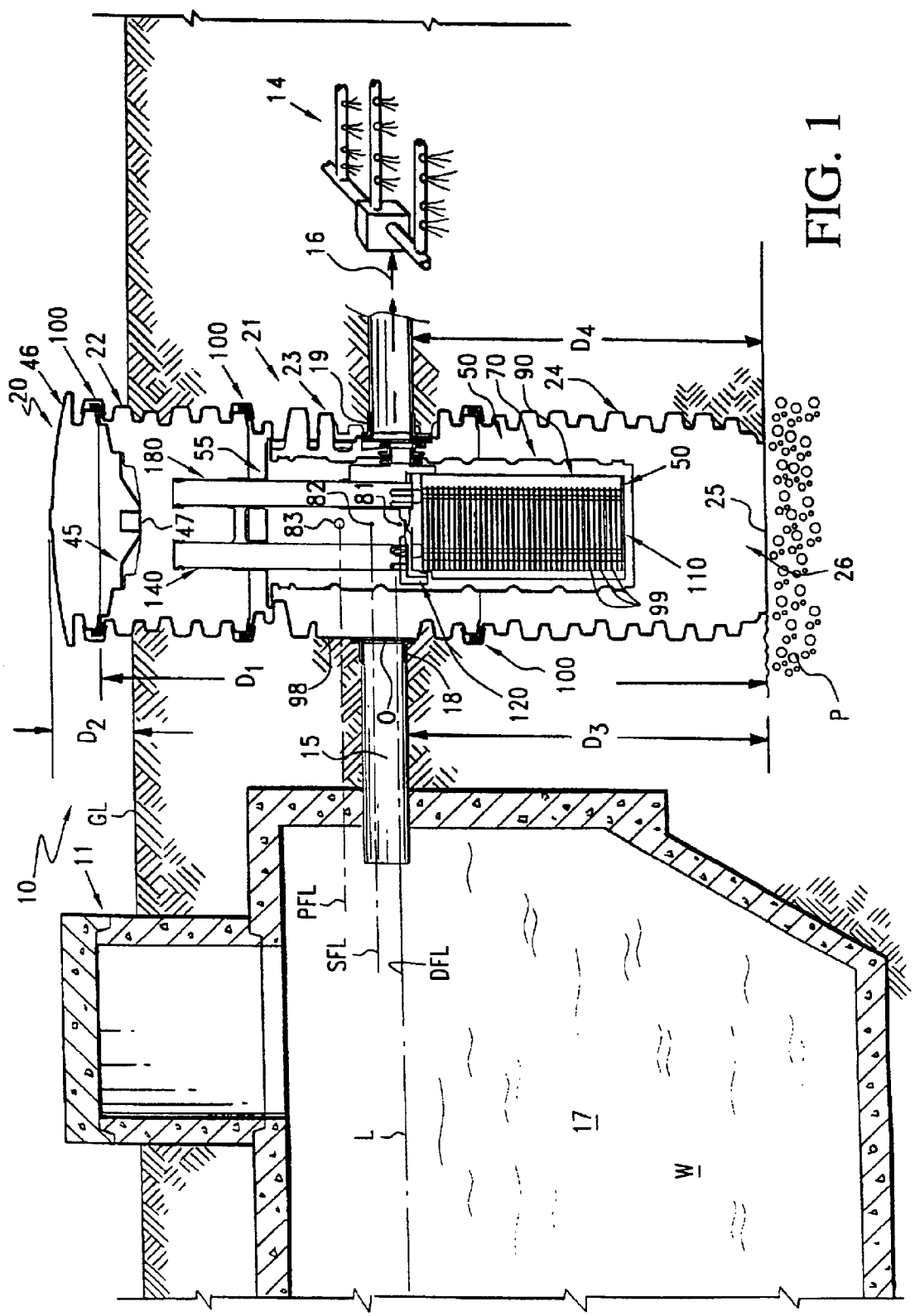
FIG. 1 is a cross sectional view of a wastewater treatment system, and illustrates a wastewater treatment unit defined by a wastewater treatment mechanism (Bio-Kinetic® device) housed within a sectional solids settling and retention basin having an inlet connected to a conventional wastewater treatment plant and an outlet connected to a pipe leading to a downstream soil absorption system, such as an irrigation system, a leaching tile field, sand filters, etc. with an upper end of the settling and retention basin being accessible above grade upon the removal of an access cover.

A novel wastewater treatment system constructed in accordance with this invention is illustrated in FIG. 1 of the drawings and is generally designated by the reference numeral 10.

The wastewater treatment system 10 includes a conventional wastewater treatment plant 11 connected by a discharge or outlet pipe 15 to a novel and unobvious wastewater treatment unit 20 of the present invention which is in turn connected by an outlet or discharge pipe 16 to a conventional soil absorption system or device 14, such as an irrigation system, a leaching tile field, or the like. In conventional wastewater systems, the wastewater treatment plant 11 is connected directly by a sewer pipe to the soil absorption system 14, obviously absent the wastewater treatment unit 20, and as the total volume of solids are discharged and accumulate in the soil absorption system 14, plugging and premature failure thereof is common. Removal of accumulated solids from a failed soil absorption system, such as the soil absorption system 14, to rejuvenate the same is not technically feasible. However, in accordance with the novel method of this invention indefinitely extends the life of a new or rejuvenating such a failed soil absorption system 14 is accomplished by first excavating earth between the wastewater treatment plant 11 and the soil absorption system 14. Thereafter the wastewater treatment unit 20 is installed as illustrated in FIG. 1 connected to the discharge of the wastewater treatment plant 11 through a newly installed outlet or discharge pipe 15 and by a newly installed outlet or discharge pipe 16 to the soil absorption system 14.

As will be described more fully hereinafter, the wastewater treatment unit 20 removes accumulated solids discharged therein from the wastewater treatment plant 11 through the pipe 15 and thus the liquid discharge from the wastewater treatment unit 20 via the discharge pipe 16 is substantially solids-free. Solids so removed by the wastewater treatment unit 20 can be periodically removed therefrom and thereby the life of the soil absorption system 14 is extended or rejuvenated.

The wastewater treatment plant 11 is of a conventional construction and corresponds to the wastewater treatment plant disclosed in U.S. Pat. Nos. 5,207,896 and 5,264,120 granted respectively on May 4, 1993 and Nov. 23, 1993 to Norwalk Wastewater Equipment Company of Norwalk, Ohio, the assignee of the present invention. The specific details of the wastewater treatment plant of the latter-identified patents is incorporated herein by reference, but excluded from a clarifier or clarification chamber 17 of the wastewater treatment system 10 is the wastewater treatment mechanism (BioKinetic® device) and instead a conventional tubular tee T is connected to the pipe 15.

The wastewater treatment unit 20 (FIGS. 1 and 2) of the present invention includes a sectional solids settling and retention basin 21 which preferably is a one-piece body molded from polymeric/copolymeric synthetic plastic material, as shall be described more fully hereinafter with respect to FIGS. 5 and 7 of the drawings, or can be constructed from a plurality of individual tubular sections, such as an upper tubular section or riser 22, an intermediate or middle tubular section 23 and a lower tubular section 24 closed by an integral bottom wall 25 collectively defining the solids settling and retention basin 21 and a solids settling and retention chamber 26 thereof in which solids entering the chamber 26 through the discharge pipe 15 from the wastewater treatment plant 11 accumulate and can be periodically removed. The discharge pipe 15 is solvent-connected to the intermediate section 23 by a conventional schedule 40 PVC inlet coupling 18 and an associated seal (not shown), and the discharge pipe 16 is likewise connected to the intermediate tubular section 23 by another schedule 40 PVC outlet coupling 19 and an associated seal (not shown).

A wastewater treatment mechanism 50 (BioKinetic® device) which corresponds in most respects to the like numbered wastewater treatment mechanism of U.S. Pat. No. 5,264,120 is suspendingly supported within the solids settling and retention chamber 26 of the solids settling and retention basin 21. The wastewater treatment mechanism 50 includes an outermost, substantially cylindrical, integral, one-piece molded filtering means, filtering media or filtering body 70 having a lower cylindrical filtering wall portion 72 of a smaller mesh than that of a upper cylindrical filtering wall portion 73 with an imaginary line 74 defining the line of demarcation therebetween. A solid wall 71 closes the bottom of the filtering means 70 and an upper end thereof terminates in a radially outwardly directed flange 75.

The filtering body 70 includes a pair of diametrically opposite flow equalization means 85 defined by vertically aligned spaced flow equalization ports 81, 82 and 83 progressively increasing in size upwardly and functioning in the manner set forth in U.S. Pat. No. 5,264,120. The sizes, spacing and function of the flow equalization ports 81 through 83 correspond to the same dimensions and functions as set forth in U.S. Pat. No. 5,264,120 which are incorporated hereat by reference.

A housing 90 having an open bottom is closed by an upper closure assembly 120 suspendingly support therein a baffle plate assembly 110 housing approximately three dozen baffle plates 99. The latter unitized components corresponding substantially in structure and function to the like components of U.S. Pat. No. 5,264,120. The upper closure assembly 120 also includes a top wall or deck having a generally T-shaped channel (not shown) which discharges liquid into an outlet port 176 slidably telescopically received in a tubular discharge pipe 453 of a first flange coupler 451 which is vertically slidably received downwardly into and upwardly out of a generally U-shaped upwardly opening flange receiving coupler 456 having an opening (unnumbered) in fluid communication with the discharge pipe 16. The couplings or coupler 451, 456 permit the entire wastewater treatment mechanism 50 to be installed into and removed from the solids settling and retention basin 21 from above, as will be more apparent hereinafter.

Means 140 in the form of a dry tablet chlorination feed tube 141 for housing stacked chlorination tablets is carried by the upper closure assembly 120 as is dechlorinating means 180 in the form of a dry tablet dechlorination feed tube 181 for housing stacked dechlorination tablets, again as the latter structures and their functions are more fully specified in U.S. Pat. No. 5,264,120.

Figure 2:
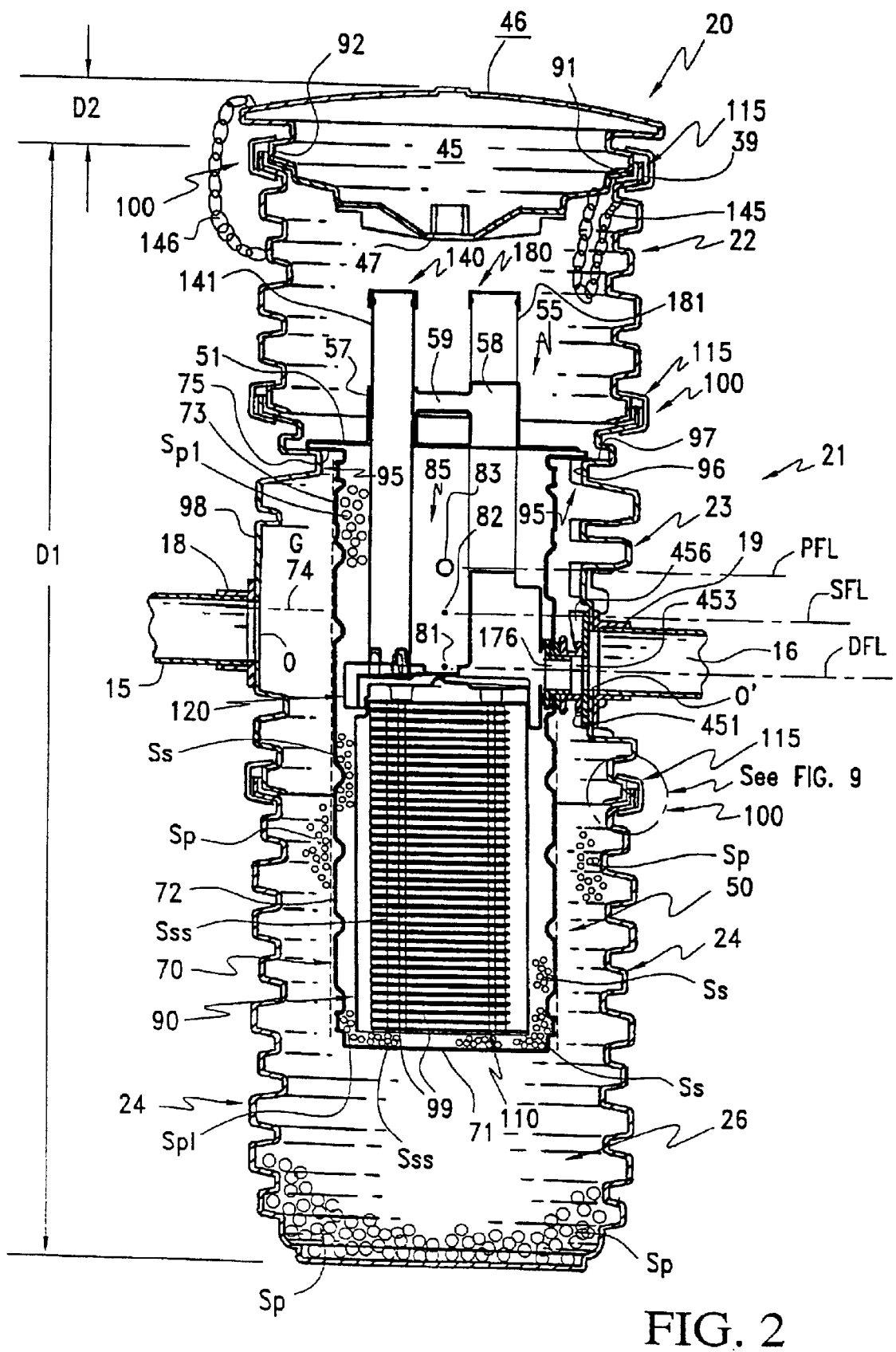
FIG. 2 is an enlarged axial cross sectional view, and illustrates details of the wastewater treatment unit including compression clamps and associated seals or gaskets for securing tubular sections of the solids settling and retention basin to each other in a water-tight fashion, as well as securing the access cover to an uppermost tubular riser section of the solids settling and retention basin.
Figure 3:
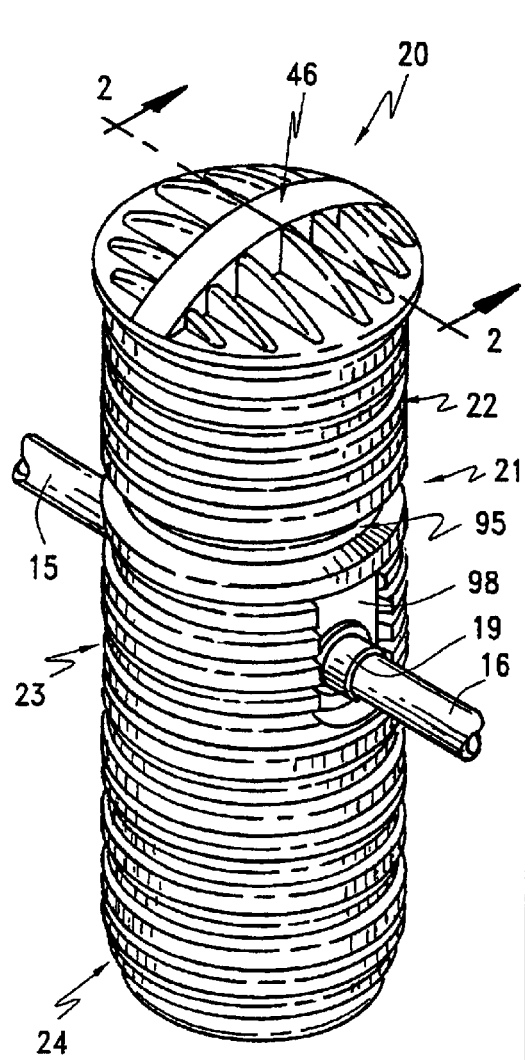
FIG. 3 is a perspective view of the wastewater treatment unit, and illustrates the exterior configuration thereof including a plurality of circumferential outwardly projecting ribs (inwardly opening valleys) and outwardly opening valleys (inwardly projecting ribs) and the access cover in its seated position.

Resting atop the flange 75 of the wastewater treatment mechanism 50 is a removable moisture/vapor closure, cover or shield 55 defined by a one-piece molded polymeric/copolymeric body including a circular disc 51, two tubular portions 57, 58 projecting upwardly therefrom, and a tubular handle portion 59 spanning the tubular portions 57, 58. When positioned as illustrated in FIG. 2 of the drawings, the tubular portions 57, 58 of the moisture/vapor cover 55 telescopically receive and stabilize the respective chlorination and dechlorination tubes 141, 181. Four equally circumferentially spaced holes (not shown) in the circular disc 51 receives fasteners, such as screws, which are threaded into like holes (also not shown) of the flange 75 to secure the moisture/vapor cover 55 to the flange 75 yet permit the rapid disassembly thereof by removing the screws (not shown). The purpose of the moisture/vapor cover or shield 55 is to prevent condensation from entering the wastewater treatment mechanism 50.

Before specifically describing the three piece sectional solids settling and retention basin 21 of FIG. 2 which is defined by the upper, intermediate and lower tubular sections 22 through 24, respectively, reference is made to FIG. 5 of the drawings which illustrates a one-piece hollow solids settling and retention body 30 molded by rotational molding, vacuum molding or injection molding from polymeric/copolymeric plastic material, such as corrosion resistant polyethylene. The hollow body 30 includes a tubular wall 31 having an upper end closed by an integral top wall 32 and a bottom end closed by an integral bottom wall 40. A plurality of alternating internally projecting peripheral ribs 33, 34 and inwardly opening valleys 35, 36 are disposed substantially along the axial length of the tubular body 31. The ribs 33 are of a substantially lesser internal diameter than the diameter of the ribs 34 and the valleys 35 are of a greater axial height and a greater diameter than the axial height and diameter of the valleys 36. For the most part, the ribs and the valleys are arranged in the axial sequence 33, 35, 34, 36; 33, 35, 34, 36; etc. Within each such sequence of ribs and valleys, each rib 33 and its adjacent valley 35 are defined by a wall 37 common to each rib 33 and each valley 35. Each rib 33 also includes an innermost cylindrical wall portion 38 and each valley 35 adjacent thereto includes an outermost cylindrical wall portion 39.

Cut lines C1, C2 define annular bands of scrap material or bands S1, S2 and S3. By cutting along the cut lines C1, C2, the shaded annular bands S1, S2 and S3 are removed as scrap material and four tubular sections 41, 42, 43 and 44 are formed therefrom. Adjacent the top wall 32, a somewhat wider circumferential band of scrap material S4 can be removed when the hollow body 30 is severed along the cut lines C1, C2 associated therewith. However, the hollow body 41 adjacent the top wall 32 terminates in two adjacent valleys 35, 35 separated by a rib 34. The purpose of this configuration is to not only create the tubular section 41 of essentially the identical contour as the tubular sections 42, 43 and 44, but also to form therefrom a generally concavo-convex wall 45 which can be rotated or flipped 180° from the position shown in FIG. 5 to that shown in FIG. 6 and thereby define a safety/surface guard, closure or cover 45, preferably having a central hole 47, for closing the solids settling and retention basin 21, as is illustrated in its operative position in FIG. 2 and FIG. 6 of the drawings. However, upon the removal of the annular scrap 4, the upper and lower edges (unnumbered) of the tubular sections 41 through 44 are identical to each other and a cylindrical wall portion 49 of each smaller valley 36 (FIG. 6) will telescopically seat within the remaining portion of the wall portion 39 of the larger valley 35 resulting in the telescopic nested supported relationship of the section 41 upon the section 42, the section 42 upon the section 43, and the section 43 upon the section 45.

The hollow body 30 and the manner in which the scrap S1 through S4 are removed therefrom is merely exemplary of many different options which are available with respect to a particular installation of the solids settling and retention basin 21 between the wastewater treatment plant 11 and the soil absorption system 14 (FIG. 1). For example, the hollow body 30 (FIG. 5) is of the same diameter as the diameter (approximately 24") of the solids settling and retention basin 21 but is only 60" in height, as compared to the approximately 70" total height of the solids settling and retention basin 21. If only the band of scrap S4 was removed, the remaining uncut tubular sections 41 through 44 of the hollow body 30 could be used in lieu of the axially shorter lower tubular section 24 (FIG. 2) of the solids settling and retention basin 21 thereby increasing the overall height, volume, and depth below grade or grade level GL thereof.

As another example, by removing all bands of scrap material S1–S5, each of the tubular sections 41 through 44 can be individually utilized to increase the height or depth below grade GL or both of the solids settling and retention basin 21 by, for example, adding one of the sections 41 through 44 to the upper tubular section or riser 22 (FIG. 2) or to the lower section 24 as a so-called ring. Depending upon the number of removed scrap bands S1 through S5, the axial heights thereof and the distances therebetween, each 60" hollow body 30 can be utilized at the site of installation as might be required. In FIG. 5, if all scrap or scrap sections S1 through S5 were removed from the areas indicated, the upper and lower tubular sections 41, 44 would each be approximately 12" in axial length and the two middle tubular sections 42, 43 would each be approximately 18" in length. These sections could be used, as desired, to alter the overall height and depth above and/or below grade GL of the solids settling and retention basin 21 by 12", 18", 24" etc. increments.

Figures 7, 8:
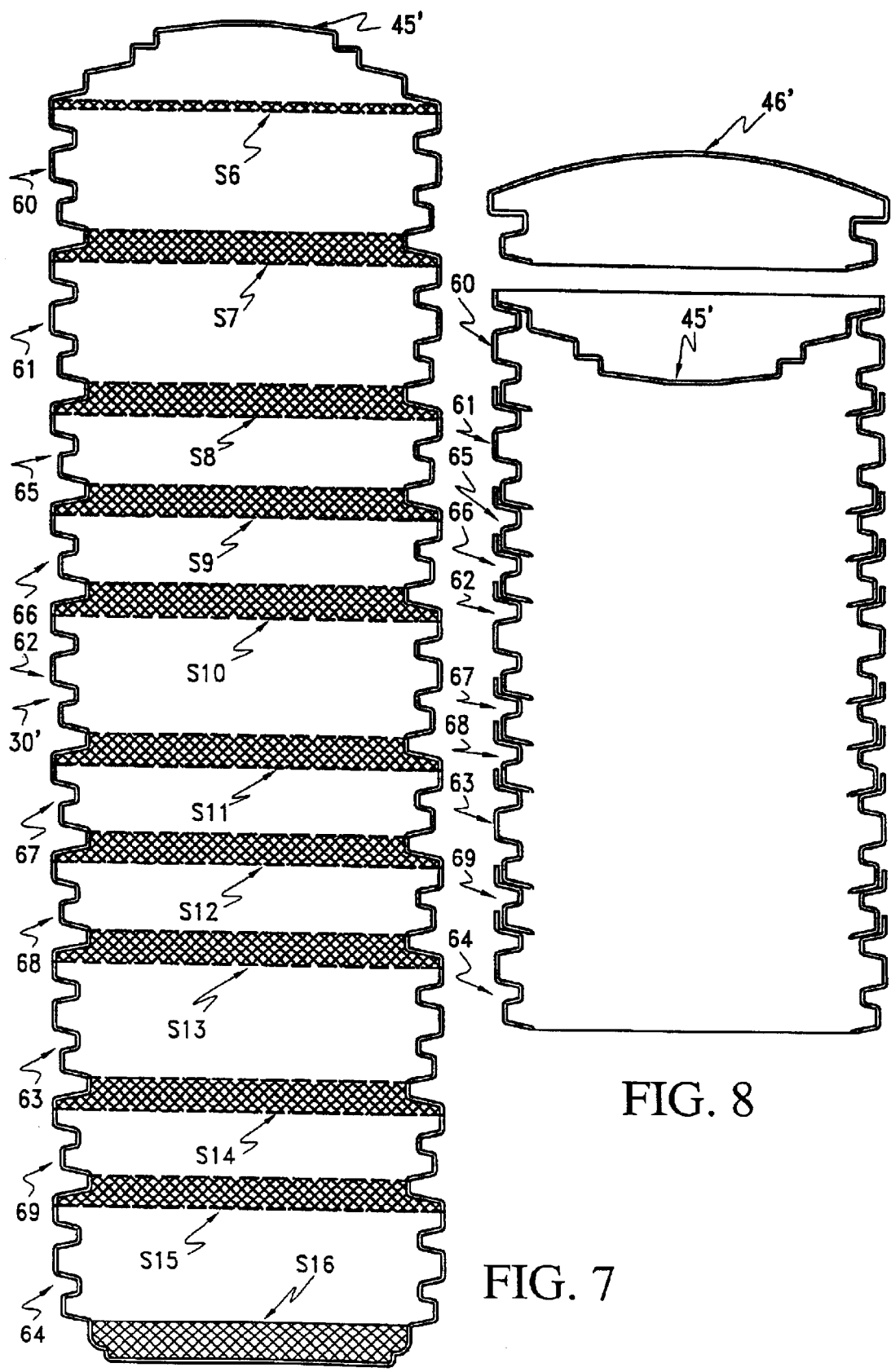
FIG. 7 is another axial cross sectional view of another one-piece solids settling and retention basin body, and illustrates as exemplary eleven shaded areas representative of annular bands of waste material which can be selectively removed and discarded and from which a solids settling and retention basin can be formed of a variable number of riser and/or ring sections differing in height from those of FIGS. 5 and 6.
FIG. 8 is an axial cross sectional view of the solids settling and retention basin body of FIG. 7, and illustrates as exemplary all of the riser/ring sections telescopically united in one of several interchangeable arrangements.

As another example of utilizing the hollow body 30 or sections thereof for particular installations, another identical hollow body 30' is illustrated in FIG. 7 and the height thereof is also approximately 60". However, in this case the hollow body 30' includes eleven tubular scrap sections S6 through S16 which if all were removed would create ten tubular riser or ring sections 60 through 69. The tubular sections 60 through 64 are each 6" in axial height and the tubular sections 65 through 69 are each 3" in axial height. Upon the removal of the cylindrical scrap material S6 through S16, the tubular sections are shown in FIG. 8 telescopically united to each other, though such is merely exemplary and will not be used in actual practice. However, any 6" tubular section 60 through 64 or any 3" tubular section 65 through 69 can be utilized as need be to increase the height or depth above or below grade GL of the solids settling and retention basin 21 of FIG. 2 in lesser axial increments than provided by the 12" tubular segments 41, 44 and the 18" tubular segments 42, 43 of the body 30 of FIG. 5. Accordingly, the hollow body 30 and the equivalent hollow body 30' demonstrate the flexibility afforded the solids settling and retention basin 21 for a variety of site installations. It is, of course, within the scope of the invention to remove, for example, only the scrap material S4 or S6 of the respective hollow bodies 30, 30' and utilize the same as a single piece basin for other purposes, such as a pump housing. For example, a preferable single piece basin of approximately 70¼" in height could be formed by molding either of the hollow bodies 30, 30' of an approximate axial length of 72". Thereafter, the removal of only the narrow scrap section S4 of the hollow body 30 or the scrap section S6 of the hollow body 30' would form a one-piece molded basin of approximately 70¼". The latter basin excludes the flat wall 98 but would be provided with openings corresponding to the openings O, 0', though if used for a pump housing, the axial offset would be unnecessary.

Figure 4:
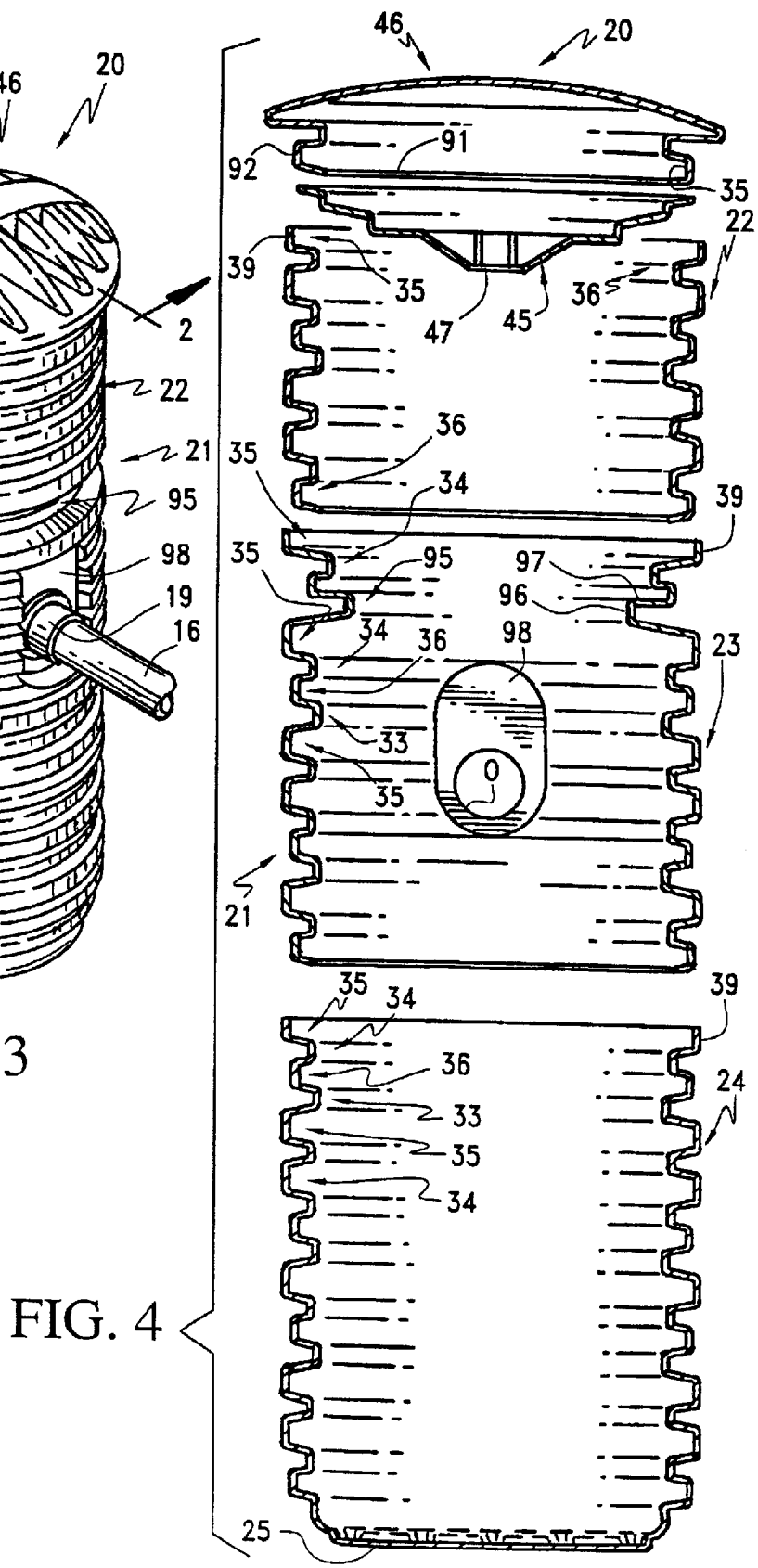
FIG. 4 is an axial cross sectional view of the solids settling and retention basin of FIGS. 1 through 3, and illustrates three individual sections prior to being united together, a safety/surface guard or cover, and the access cover.

Reference is made to FIG. 4 of the drawings which more specifically demonstrates details of the intermediate or middle tubular section 23, as compared to the upper tubular section 22, the lower tubular section 24, or any of the tubular sections 41 through 44 and 60 through 69. The major difference is an inwardly projecting rib 95 (FIG. 4) having an innermost cylindrical wall portion 96 of a diameter less than the diameter of the ribs 33, 34 and an upper substantially horizontal wall portion 97. The rib 95 projects inwardly substantially beyond the inward projection of any of the ribs 33, 34, and this allows the wastewater treatment mechanism 50 to be inserted into and withdrawn from the solids settling and retention basin 21 through the open upper end (unnumbered) upon the removal of the safety/service cover 45 and a separately fabricated heavy duty access cover 46. Since the flange 75 (FIG. 2) of the filter media body 70 of the wastewater treatment mechanism 50 has a diameter substantially greater than the opening defined by the cylindrical wall portion 96 of the rib 95, the flange 75 is underlyingly supported by the horizontal wall portion 97 of the rib 95 of the tubular section 23. Additionally, there is a considerable annular gap G (FIG. 2) between the solids settling and retention basin 21 and the filter body 70 of the wastewater treatment mechanism 50 which allows the entire filter body 70 to be shifted radially to the left, as viewed in FIG. 2, to withdraw the outlet port 176 from the tubular discharge pipe 453 and vice versa incident to disassembly and reassembly, respectively, for purposes of installation, inspection servicing and/or cleaning.

The intermediate or medial tubular section 23 also includes two diametrically opposite relatively flat wall portions 98 having respective openings O, O' (FIG. 2) preferably cut therein at the plant or factory immediately after the molding of the tubular section 23 or an entire one-piece basin 21, as will be described more fully hereinafter. The inlet coupling 18 and the outlet coupling 19 are also preferably bolted (not shown) to the tubular section 23 at the factory. The axis Ao of the opening O (FIG. 2) is 1" above the axis Ao' of the opening O' creating thereby an automatic and natural 1" fall between the two openings O, O'.

The upper tubular section 22 (FIG. 2), normally termed a "riser" in the trade, is clampingly secured to the intermediate tubular section 23 by a compression clamp and seal assembly 100. In FIG. 2 an identical compression clamp and seal assembly 100 clamps the medial tubular section 23 to the lower section 24 and, of course, identical compression clamp and seal assemblies 100 are utilized to connect other upper tubular sections or risers as desired above the medial tubular section 23 and like tubular sections, which are normally termed "rings" in the trade, when added beneath the middle tubular section 23. A like compression clamp and seal assembly 100 also clamps the heavy duty access cover 46 to the upper tubular section or riser 22 with a peripheral edge (unnumbered) of the safety/service cover 45 being sandwiched between wall portions (unnumbered) of the uppermost rib 34 of the tubular section 22 and an inwardly directed peripheral wall 91 (FIGS. 2, 4 and 6) of an outwardly directed rib 92 of the heavy duty access cover 46.

Figure 9:
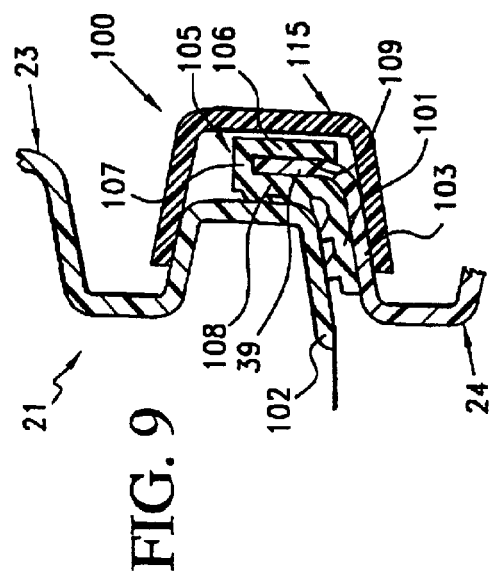
FIG. 9 is a highly enlarged axial cross sectional view of the encircled portion of FIG. 2, and illustrates a compression clamp and seal assembly formed by an annular sealing gasket interposed between telescopic tubular sections of the sectional solids settling and retention basin and the compression clamp clamping the sections together in a water-tight fashion.
Figure 10:
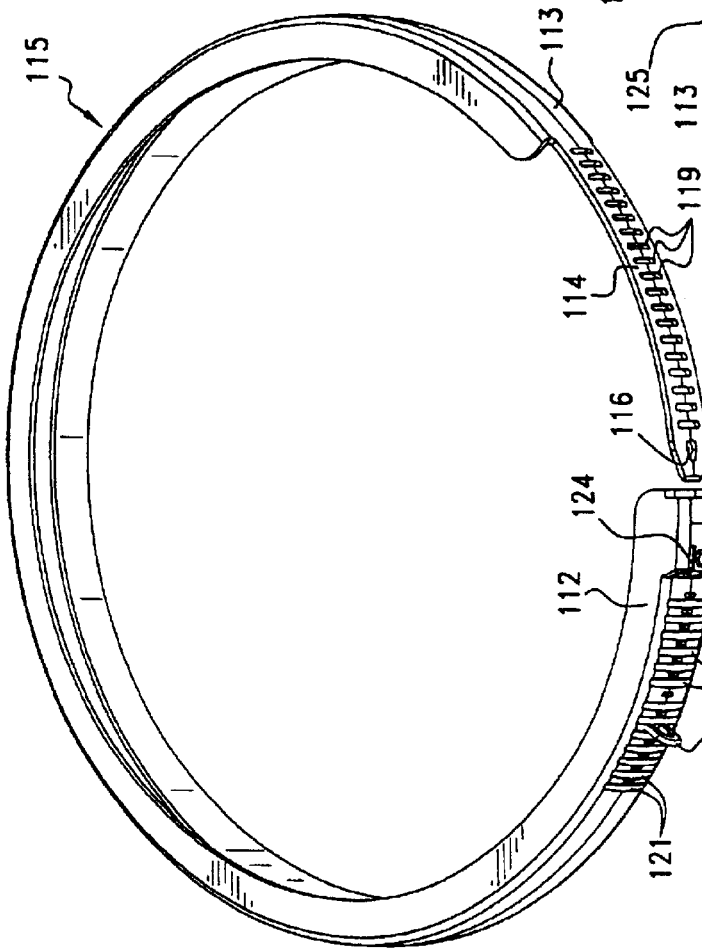
FIG. 10 is a top perspective view of the compression clamp, and illustrates opposite ends thereof, one end being in the form of a projecting tab or tongue having a plurality of elongated slots or openings, and the other end having an apertured wall or shoulder through which the tongue projects and a flexible locking tab having an inward projection which is received in one of the openings of the projecting tongue.

The compression clamp and seal assembly 100 is best illustrated in FIG. 9 of the drawings, and includes an O-ring type annular seal 105 and a compression clamp 115. The annular seal 105 includes an outer cylindrical leg portion 106, a bight portion 107, and an inner cylindrical leg portion 108 collectively defining therebetween a slot or groove 109 which receives the wall portion 39 of the lower tubular section 24. A generally radially inwardly directed wall portion 101 of the annular seal 105 is sandwiched between opposing generally radial wall portions 102, 103 of the intermediate tubular section 23 and the lower tubular section 24, respectively. A number of conventional annular sealing lips (unnumbered) are carried by the wall portions 108, 101.

Figure 11:
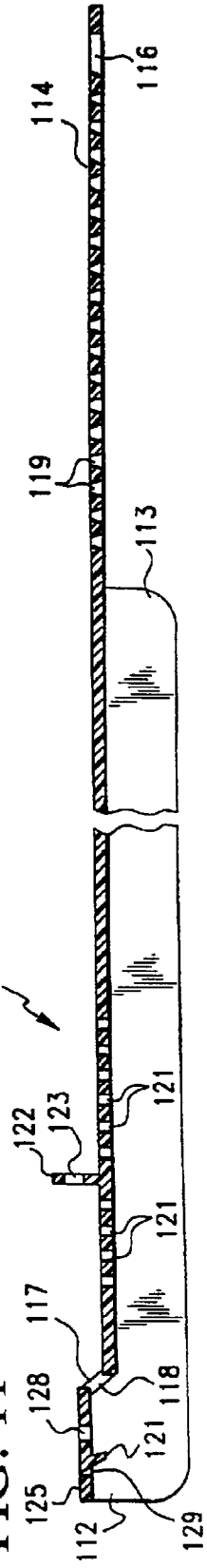
FIG. 11 is an enlarged fragmentary longitudinal cross sectional view of the compression clamp of FIG. 10, and illustrates details of the opposite ends thereof including the inward projection which seats in one of the openings of the tongue.

The compression clamp or clamping means 115 of the compression clamp and seal assembly 100 is a one-piece molded polymeric/copolymeric band of a substantially U-shaped configuration over a major portion of the length thereof from a first end portion 112 to an opposite second end portion 113 at which a minor portion 114 continues in the form of a tongue or tab having a plurality of equally spaced narrow slots 119 and a tool receiving opening 116. The end portion 112 of the major portion includes an upstanding wall 117 (FIG. 11) having a slot 118 and adjacent to the latter a depending flexible latching tab 125 carries a projection 121. The flexible latching tab 125 is bordered by a U-shaped slot 124. A slot 128 is formed through the flexible locking tab 125. The first end portion 112 further includes a group of equally spaced slots 121 and an upstanding locking tab 122 having an opening 123.

Figure 12:
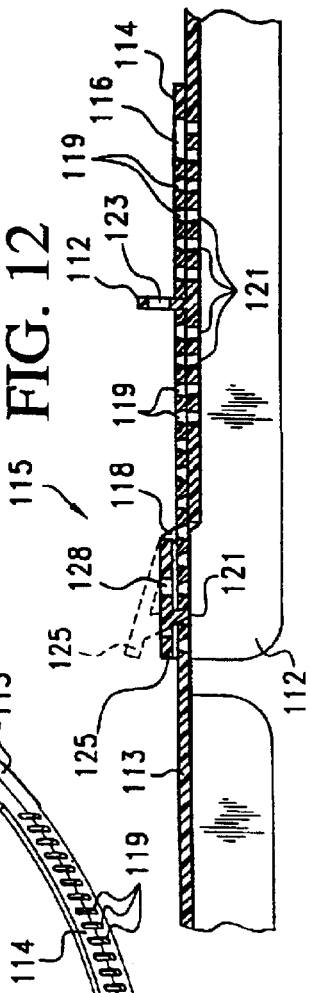
FIG. 12 is a fragmentary longitudinal cross sectional view of the compression clamp, and illustrates the compression clamp in its clamped position.

After the annular seal 105 has been assembled upon the wall portion 39 in the manner illustrated in FIG. 9, the upper tubular riser section 23 is seated upon the sealing lips (unnumbered) of the radial wall portion 101 of the annular seal 105 after which the compression clamp 115 is positioned in loosely surrounding relationship thereto, as is also illustrated in FIG. 9 of the drawings. The tongue 114 of the compression clamp 115 is inserted through the slot 118 (FIG. 12) and over and beyond the locking tab 122. A tool, such as a screwdriver, is then inserted through the tool receiving opening 116 or any one of the slots 119 and the end of the blade thereof is seated in a selected one of the slots 121 of the first end portion 112 of the compression clamp 115 after which the screwdriver is levered or fulcrumed in a conventional manner to draw the tongue 114 further through the slot 118 and further over and further beyond the locking tab 122 which progressively constricts the compression clamp 115 against the outer cylindrical leg portion 106 (FIG. 9) of the annular seal 105 eventually creating a water-tight seal therebetween and a water-tight seal between the sealing lips (unnumbered) and the opposing wall portion 39 of the valley 36. When the compression clamp 115 is tightened manually in this fashion sufficiently to assure a water-tight seal, the tongue 114 is manipulated as need be by utilizing the screwdriver to align one of the slots 119 of the tongue 114 with the locking tab 122 and subsequently uniting the two together in the manner illustrated in FIG. 12 at which point the locking tab or projection 122 projects through one of the slots 119, as is illustrated in FIG. 12. If desired a lock, bolt, locking ring or a wire can be passed through the opening 123 of the locking tab 122 and thereafter twisted to preclude inadvertent/accidental disassembly of the locking tab 122 from its assembled condition (FIG. 2).

The compression clamp 115 performs a number of functions effectively, such as compressing the annular gasket 105 to effect a water-tight seal between any two components, preventing vertical separation between components, maintaining horizontal alignment of the components, and creating in effect two seals, one afforded by the inner cylindrical leg portion 108 and the other by the radially inwardly directed wall portion 101 of the annular seal or gasket 105. The latter assures a water-tight seal between all tubular sections and between the uppermost tubular section or riser 22, the associated safety/service cover 45 thereof, and the heavy duty access cover 46. The latter two covers 45, 46 are also preferably tether-connected to the upper tubular section or riser 23 by respective retainer cables 145, 146, respectively (FIG. 2).

The compression clamp 115 is released and removed by first releasing and removing the locking ring or twisted wire passing through the opening 123. Thereafter the end of the tongue 114 adjacent the slot 116 can be manually gripped or gripped by a pair of pliers and pulled upwardly to remove locking tab 122 from its associated slot 119. At this time the flexible latching tab 125 is still engaged in its associated slot 119 (FIG. 12) and further lifting of the tongue 114 upwardly will have no effect thereon. A blade of the screw driver is inserted through the slot 128 with its end engaged against the underlying upper surface (unnumbered) of the first end portion 112, and thereafter the blade is pivoted or torqued to the right, as viewed in FIG. 12, causing the flexible latching tab 125 to flex to the phantom outline position of FIG. 12 which draws the depending latching projection 121 outwardly of its associated slot 119 thereby completely releasing the compression clamp 115.

Installation

Reference is made to FIG. 1 of the drawings, and it is assumed for the moment that the wastewater treatment unit 20 has not been installed and that a single pipe or sewer pipe extends from the wastewater treatment plant 11 to the soil absorption system 14 which has become "plugged" through the retention of solids, as described earlier herein, thereby potentially causing a back-up of sewage into an associate home (not shown). The soil absorption system 14 is considered "failed" and "rejuvenation" of a "failed" soil absorption system 14 is not technically feasible, except at the considerable inconvenience, danger and expense earlier noted. However, in keeping with the present invention, the site at which the waste treatment unit 20, and particularly the solids settling and retention basin 21, is to be installed is first excavated by simply digging a hole to expose the existing sewer line or pipe (not shown). A relatively narrow sewer trench is dug along the length of the original sewer line to enable its entire removal. A hole must also be dug or excavated for the solids settling and retention basin 21. Since the maximum outside diameter of the solids settling and retention basin 21 is approximately 24", the excavation should be at a minimum of 36"×36" square or approximately 36" diameter, if round. The exact excavation depth depends upon a variety of factors and of importance is the vertical distance between grade or grade level GL and the outlet (unnumbered) of the clarifier 17 from which the old sewer line is removed and replaced by the outlet pipe 15. The closer the outlet pipe 15 to grade level GL, the less the depth of the excavation and vice versa. One or more risers of required heights might necessarily have to be added above the middle tubular section 21, while one or more rings of required heights might necessarily have to be added below the middle tubular section 21 depending upon the specifics of the installation. As a typical example, the excavation for the solids settling and retention basin 21 is preferably deep enough to permit a minimum 4" levelling bed or pad P of gravel, sand or fine crushed stone upon which rests the bottom wall 25 of the solids settling and retention basin 21. In actual practice and in the present example the distance D1 between the upper edge (unnumbered) of the upper tubular section or riser 22 (FIGS. 1 and 2) and the bottom wall 25 is approximately 70¼" and the distance D2 from the top of the heavy duty access cover 46 and grade level GL is approximately 7½". Thus the total depth of the excavation would be approximately 75" to 80" depending upon the total thickness or depth of the leveling pad P.

The new outlet pipe (influent sewer line) 15 is then connected to the clarifier opening (unnumbered) of the wastewater treatment plant 11, though not permanently connected thereto. The outlet pipe (effluent sewer line) 16 can be positioned in the sewer trench, generally as illustrated in FIG. 1, though not necessarily permanently connected to the soil absorption system 14. The distance between the top surface of the leveling pad P and the center of the pipe 15 is measured to assure that the inlet coupling 18, previously bolted to the flat wall portion 98 of the tubular section 23, will be in axial alignment with the pipe 15. Obviously, the axis of the pipe 15 must be preferably 1" minimum above the axis of the pipe 16 upon the complete installation of the wastewater treatment unit to assure that the pipes 15, 16 are aligned with and enter into the couplings 18, 19 which are of the same 1" fall because of the 1" difference in the axes Ao and Ao' earlier described. In the specific example given the lower tubular section 24 of the solids settling and retention basin 21 is selected and, for example, formed by selectively removing scrap material from several of the molded basin bodies 30 such that when clamped to the middle tubular section 21 and installed with the bottom wall 25 resting upon the levelling pad P, the total distance D3 from the bottom wall 25 to the volute (bottom) of the pipe 15 is approximately 38⅛ and the distance D4 of the volute (bottom) of the pipe 16 from the bottom wall 25 of the solids settling and retention basin 21 is 37⅛" which is a natural 1" fall between the two.

The solids settling and retention basin 21 is then lowered into the excavation with its bottom wall 25 seated upon the upper surface of the levelling pad P after which the pipe 15 can be inserted into and solvent-welded to the coupling 18. An appropriate conventional seal is provided between the outlet pipe 15 and the wall (unnumbered) of the wastewater treatment plant 11. The pipe 16 is likewise inserted into and solvent-welded to the coupling 19 and to the soil absorption system 14. Prior to making the latter permanent connections, a level is applied to the solids settling and retention basin 21 to assure horizontal level and vertical plum thereof.

The solids settling and retention basin 21 should be back-filled immediately after the pipes 15, 16 have been permanently installed. The sewer trench above the pipes 15, 16 should also be back-filled. However, before back-filling the heavy duty access cover 46 should be at least seated upon, though not necessarily locked to the riser 22 to prevent dirt or debris from entering the solids settling and retention basin 21 during back-filling. The finished grade GL should be 3" below the upper edge (unnumbered) of the solids settling and retention basin 21.

Immediately after back-filling, the access cover 46 is removed and the solids settling and retention basin 21 is filled with hold down water, although the hold down water can be added before back-filling.

The filtering body 70 of the wastewater treatment mechanism 50, excluding the housing 90, the upper closure assembly 120, the baffle plate assembly 110 carried by the upper closure assembly 120, the chlorination feed tube 141, the dechlorination feed tube 181, the moisture/vapor shield or cover 55 and the safety/service cover 45, is lowered into the solids settling and retention basin 21. Natural buoyancy created by the hold down water will cause the filtering body 70 to tend to float in the hold down water, but a hose can be utilized to direct water into the filtering body 70 through the open upper end thereof resulting in the gradual sinking of the filtering body 70 into the solids settling and retention basin 21. During the latter assembly the filtering body 70 is aligned such that the flange coupler 451 (FIG. 2) progressively vertically enters into and seats in the U-shaped receiving flange or coupling 456 (FIG. 2). In the final installed position of the filtering body 70 the flange 75 thereof rests upon the rib 95 of the solids settling and retention basin 21. Means (not shown) may be utilized to secure the flange 75 upon the rib 95, as, for example, four circular discs equally spaced about the periphery of the flange 75 and vertically pivotally mounted thereto in an eccentric fashion such that each disc can be rotated in a horizontal plane about a vertical axis from a position entirely inside the periphery of the flange 75 to a radially outwardly projecting position with a portion of each disc being received within the opposing valley and underlying the uppermost rib of the solids settling and retention basin 21 thereby preventing vertical withdrawal of the filtering body 70 therefrom.

Thereafter the unitized housing 90, the upper closure assembly 120, and the baffle plate assembly 110 suspendingly supported from the latter are inserted progressively into the filtering body 70 until the outlet port 176 is aligned with the tubular discharge pipe 453 of the first flange coupler 451 after which the housing 90 is shifted to the right to the position illustrated in FIG. 2.

The moisture/vapor shield or cover 55 is positioned atop the flange 75 and is conventionally secured thereto by passing fasteners through openings (not shown) in the circular disc 51 of the safety/service guard or cover and threading the same into the flange 75 of the filtering body 70. The chlorination tube 141 and the dechlorination tube 181 are telescopically assembled through the tubular portions 57, 58, respectively, to the position illustrated in FIG. 2. Chlorination tablets are inserted in the chlorination tube 141 and dechlorination tablets are inserted into the dechlorination tube 181 before or after the latter installation with caps (unnumbered) being appropriately assembled thereon. The safety/service guard or cover 45 and the heavy duty access cover 46 are then assembled, as shown in FIG. 2, and locked by means of the associated compression clamp and seal assembly 100.

Operation

Under normal conditions, wastewater W (FIG. 1) within the clarification chamber or clarifier 17 of the wastewater treatment plant 11 is at a wastewater level L dependent upon the hydraulic head, and the rate of flow of the wastewater/effluent through the wastewater treatment unit 20 and particularly the wastewater treatment mechanism 50 thereof will depend upon the head or height of the wastewater within the clarification chamber 17. During such normal hydraulic head, the level L of the wastewater approximates the position of the lowermost of the diametrically opposite pair of flow equalization ports or openings 81, and this is the design flow level DFL of the wastewater treatment unit 20, as established by the flow equalization ports 81 of the wastewater treatment mechanism 50. Under such normal design flow conditions, wastewater not only accumulates in the solids settling and retention basin 21, but small solids or particles Ss (FIG. 2) pass through the smaller mesh of the lower cylindrical filtering wall portion 72 while larger solid particles Sp falling downwardly and accumulating upon and above the bottom wall 25 of the solids settling and retention basin 21. The wastewater and still smaller particles Sss which have passed through the filtering wall portion 72 but are too light to settle upon the bottom wall 71 of the filtering body 70 flow upwardly and through the baffle plate assembly 110 during which the smallest particles are filtered out from the wastewater by the baffle plates 99. The wastewater eventually discharges through an opening (not shown) in the upper closure assembly 120 and passes through the outlet ports 176, 453 into the pipe 16 with prior chlorination and dechlorination being effected, if desired, in the manner disclosed in U.S. Pat. No. 5,264,120. In the case of a retro fit for a failing or failed disposal system, the essentially solids-free wastewater/effluent continues toward its discharge at the soil absorption device 14 which though plugged can absorb and disperse the substantially solids-free effluent thereby rejuvenating the entire wastewater treatment system 10 due to the extraction of the solids or solid particles Sp, Ss, Sss and Spl within the solids settling and retention basin 21, the bottom wall 71 and within and upon the approximately three dozen baffle plates 99 of the baffle plate assembly 110. Should the installation be for a new wastewater treatment system, the substantial solids-free effluent extends the life of the disposal system substantially indefinitely.

Should the flow of wastewater from the clarification chamber 17 exceed the design flow designated by the design flow level DFL (FIG. 2), as controlled by the diametrically opposite flow equalization ports 81, the wastewater will rise to a higher sustained flow level SFL at which the pair of flow equalization ports 82 become operative, as described in U.S. Pat. No. 5,264,120.

During peak flow of wastewater from the clarification chamber 17, the wastewater reaches a peak flow level PFL established by the larger diameter flow equalization ports 83, just as in the case of U.S. Pat. No. 5,264,120 with, of course, solids or solid particles Spl passing through the larger mesh of the upper cylindrical filtering wall portion 73 and settling down and upon the bottom wall 71 of the filtering body or filtration media body 70.

Servicing and Cleaning

Access to the interior of the wastewater treatment unit 20 is required from time-to-time during normal use and is readily effected by removing the compression clamp 115 associated with the access cover 46. Upon unlatching and removing the compression clamp 115, the access cover 46 and the safety/service cover 45 can be removed. The chlorination and dechlorination tubes 141, 181 can simply be filled with tablets or can be removed by pulling the same vertically upwardly. Each tube 141, 181 can be flushed and cleaned, refilled with chlorination and dechlorination tablets, and reassembled to the position illustrated in FIG. 2 after which the components 45, 46 and 115 can be reassembled. Obviously the feed tubes 141, 181 need not be removed when the only servicing required is to add respective chlorination and dechlorination tablets thereto.

Over longer periods of time the entire wastewater treatment unit 20 must be completely cleaned to remove all of the solids accumulated in the solids settling and retention basin 21, all of the solids accumulated upon the bottom wall 71 of the filtering body 70 and all of the solids accumulated upon each of the baffle plates 99 of the baffle plate assembly 110. Such servicing is again accomplished by first removing the uppermost compression clamp 115, the access cover 46 and the safety/service cover 45. The feed tubes 141, 181 are then withdrawn upwardly and removed followed by the removal of the moisture/vapor shield or cover 55 after unfastening the cover disc 51 from the flange 75 of the filter media body 70.

The entire housing 90 of the wastewater treatment mechanism 50 can now be lifted upwardly by, for example, manually grasping the closure assembly 120 or utilizing a special tool (not shown) which interlocks with the upper closure assembly 120. Since the baffle plate assembly 110 is secured to the upper closure assembly 120, the unitized components 90, 110, 120 are removed in unison. The unitized components 90, 110, 120 must, of course, be lifted straight up, as viewed in FIG. 2, to remove the outlet port 176 from the discharge pipe 453 prior to lifting and removing components upwardly and outwardly from the filter media body 70.

The flange 75 of the filter media body 70 is then detached from the solids settling and retention basin 21 by rotating the eccentrically mounted, vertically pivoted, four circular discs in a horizontal plane (not shown and earlier described) to remove the same from the opposing valley which is the uppermost unnumbered valley of the middle tubular section 23 of the solids settling and retention basin 21. The solids settling and retention basin 21 can then be lifted vertically upwardly to detach the couplings 451, 456. A suction hose/line can be inserted into the filtering body 70 to withdraw wastewater and solids therefrom prior to lifting the filtering body 70 upwardly and outwardly of the solids settling and retention basin 21 to ease the effort involved in this task. The same suction line can then be inserted into the solids settling and retention basin 21 to draw wastewater and the solids accumulated therein while simultaneously washing and cleaning the interior of the solids settling and retention basin 21 utilizing water from a garden hose until the solids settling and retention basin 21 is thoroughly cleansed and rinsed. Thereafter, the safety/service cover 45 can be temporarily seated in the upper end of the riser 22 to preclude dirt or debris from entering the now cleaned solids settling and retention basin 21 while cleansing the withdrawn remaining components in the immediately environs. Water from a garden hose is directed to all surfaces of all of these components including the individual baffle plates 99 upon disassembly thereof from the baffle plate assembly 110 in the manner disclosed in U.S. Pat. No. 5,264,120.

After all components have been thoroughly cleaned, they are reassembled in a manner apparent from the description of the disassembly thereof, with, of course, chlorination and dechlorination tablets being added to the respective feed tubes 141, 181 before or after the reassembly thereof. The moisture/vapor cover 55, the safety/service closure 45, the access cover 46 and the compression clamp 115 are reassembled in the manner shown in FIG. 2, and the wastewater treatment unit 20 is ready for continued long term wastewater treatment/disposal.

It is to be particularly understood that though the solids settling and retention basin 21 of FIGS. 1 and 2 is sectional, the same can and for the most part will remain as a one-piece molded body as aforesaid with the openings O, O" being cut therein at the factory to make certain that the axis Ao is 1" higher than the axis Ao' of the opening O' thereby assuring the necessary natural 1" fall to achieve efficient flow-through from the pipe 15 to the pipe 16. Also, with the connectors 18, 19 being bolted to the wall portions 98 at the factory, when the one-piece solids and retention basin 21 is delivered to the site for installation, the only major criteria required for proper flow-through is to make certain that the discharge pipe 15 has an acceptable fall from the wastewater treatment plant 11 to the opening O and additional fall from the opening O' to the soil absorption system 14.

Also though the invention has been described specifically with respect to the installation of the wastewater treatment unit 20 relative to an existing wastewater treatment plant 11 and a plugged soil absorption system 14, the wastewater treatment plant 11 is equally applicable to "new" installations. In the case of a new installation, an area of the ground must be excavated to also include the new wastewater treatment plant 11 and, of course, a new soil absorption system 14 is installed. Obviously, there are no pre-existing sewer pipes to remove and, therefore, the installation remains essentially identical for the new system as that earlier described for the "old" or "plugged" system.

Although a preferred embodiment of the invention has been specifically illustrated and described herein, it is to be understood that minor variations may be made in the apparatus without departing from the spirit and scope of the invention, as defined the appended claims.

What is claimed is:

1. A compression clamp comprising a one-piece molded polymeric/copolymeric band of a substantially U-shaped configuration along at least one portion of the length thereof, said band having opposite first and second end portions, a minor terminal tongue projecting beyond said second end portion, said tongue having a plurality of spaced slots, the first end portion having an upstanding wall with a slot therein adapted to slidingly receive therein said tongue, a flexible tab disposed adjacent said slot, and said flexible tab having a projection directed for entry into selected one of said plurality of spaced slots upon said tongue being slid into and through said slot.

2. The compression clamp as defined in claim 1 wherein said flexible tab is defined by a wall projecting in a direction away from a terminal edge of said first end portion.

3. The compression clamp as defined in claim 1 wherein said flexible tab is defined by a wall projecting in a direction away from a terminal edge of said first end portion, and said flexible tab is defined by a substantially U-shaped slot opening in a direction toward said first end portion terminal edge.

4. The compression clamp as defined in claim 1 including means carried by said first end portion for sliding receipt in one of said plurality of slots.

5. The compression clamp as defined in claim 1 including means carried by said first end portion for sliding receipt in one of said plurality of slots, and said last-mentioned means is an upwardly projecting lacking tab.

6. The compression clamp as defined in claim 1 including means carried by said first end portion for sliding receipt in one of said plurality of slots, and said last-mentioned means is an upwardly projecting locking tab having an opening therein adapted to receive a locking mechanism.

7. The compression clamp as defined in claim 1 including a plurality of spaced means along said second end portion for receipt thereat of an end of a lever first passed through one of said plurality of slots for tightening the compression clamp about an associated body.

8. The compression clamp as defined in claim 2 including means carried by said first end portion for sliding receipt in one of said plurality of slots.

9. The compression clamp as defined in claim 2 including means carried by said first end portion for sliding receipt in one of said plurality of slots, and said last-mentioned means is an upwardly projecting locking tab.

10. The compression clamp as defined in claim 3 including means carried by said first end portion for sliding receipt in one of said plurality of slots.

11. The compression clamp as defined in claim 3 including means carried by said first arid portion for sliding receipt in one of said plurality of slots, and said last-mentioned means is an upwardly projecting locking tab.

12. The compression clamp as defined in claim 2 including a plurality of spaced means along said second end portion for receipt thereat of an end of a lever first passed through one of said plurality of slots for tightening the compression damp about an associated body.

13. The compression clamp as defined in claim 3 including a plurality of spaced means along said second end portion for receipt thereat of an end of a lever first passed through one of said plurality of slots for tightening the compression clamp about an associated body.

* * * * *